(12) United States Patent
Tsuchiya

(10) Patent No.: US 10,248,100 B2
(45) Date of Patent: Apr. 2, 2019

(54) NUMERICAL CONTROLLER

(71) Applicant: FANUC CORPORATION, Minamitsuru-gun, Yamanashi (JP)

(72) Inventor: Masahiko Tsuchiya, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 50 days.

(21) Appl. No.: 15/364,586

(22) Filed: Nov. 30, 2016

(65) Prior Publication Data

US 2017/0153623 A1 Jun. 1, 2017

(30) Foreign Application Priority Data

Dec. 1, 2015 (JP) ................................. 2015-234452

(51) Int. Cl.
*G05B 19/18* (2006.01)
*B23B 31/16* (2006.01)
(Continued)

(52) U.S. Cl.
CPC ............ *G05B 19/186* (2013.01); *B23B 13/00* (2013.01); *B23B 13/022* (2013.01); *B23B 31/16* (2013.01); *G05B 19/042* (2013.01); *G05B 19/402* (2013.01); *G05B 2219/36204* (2013.01); *G05B 2219/45217* (2013.01);
(Continued)

(58) Field of Classification Search
CPC ...... G05B 19/4015; G05B 2219/37207; G05B 2219/37231; G05B 2219/50031; B23B 13/022; B23B 31/16; B23P 13/00; Y10T 29/4981; Y10T 29/49996; Y10T 29/5107; Y10T 408/172; Y10T 82/21; Y10T 82/25
See application file for complete search history.

(56) References Cited

U.S. PATENT DOCUMENTS 4,270,253 A * 6/1981 Herb ....................... B23P 13/00
269/54.5
4,428,055 A * 1/1984 Zurbrick ............ G05B 19/4015
318/572
(Continued)

FOREIGN PATENT DOCUMENTS

JP 5554101 A 4/1980
JP H 04-360704 A 12/1992
(Continued)

OTHER PUBLICATIONS

Notification of Reasons for Refusal for Japanese Application No. 2015-234452, dated Dec. 19, 2017 with translation, 6 pages.

*Primary Examiner* — Crystal J Barnes-Bullock
(74) *Attorney, Agent, or Firm* — RatnerPrestia

(57) ABSTRACT

A numerical controller according to the present invention includes: a turning condition designation unit that designates a machining condition of turning; a nicking condition designation unit that designates a machining condition of nicking; a fixed cycle instruction analysis unit that generates an instruction sequence of a turning cycle operation based on the turning machining condition; and a nicking operation instruction generation unit that generates an instruction sequence of a nicking cycle operation based on the turning machining condition and the nicking machining condition. The numerical controller executes the instruction sequence of the nicking cycle operation before executing the instruction sequence of the turning cycle operation.

5 Claims, 10 Drawing Sheets

(51) Int. Cl.
*B23B 13/00* (2006.01)
*B23B 13/02* (2006.01)
*G05B 19/042* (2006.01)
*G05B 19/402* (2006.01)

(52) U.S. Cl.
CPC ...... *Y10T 29/4981* (2015.01); *Y10T 29/49996* (2015.01); *Y10T 29/5107* (2015.01); *Y10T 82/21* (2015.01); *Y10T 82/25* (2015.01); *Y10T 408/172* (2015.01)

(56) References Cited

U.S. PATENT DOCUMENTS

| | | | |
|---|---|---|---|
| 4,462,147 A * | 7/1984 | Herb | B23P 13/00 29/423 |
| 7,243,584 B1 * | 7/2007 | Gatton | B23B 31/102 82/112 |
| 2015/0075339 A1 * | 3/2015 | Simpkins | B23B 13/123 82/127 |

FOREIGN PATENT DOCUMENTS

| | | |
|---|---|---|
| JP | 07328801 A | 12/1995 |
| JP | 2010234478 A | 10/2010 |

* cited by examiner

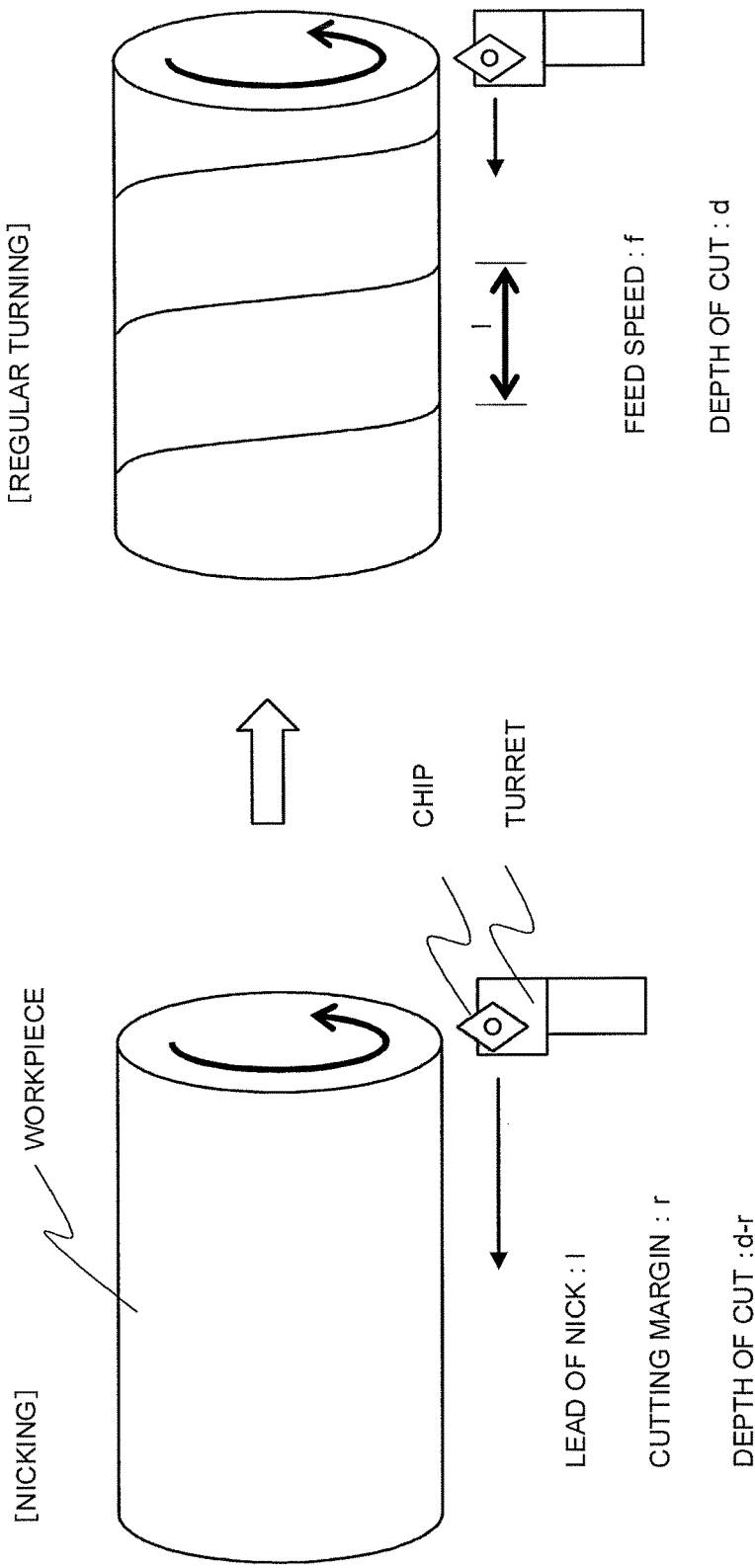

FIG.2

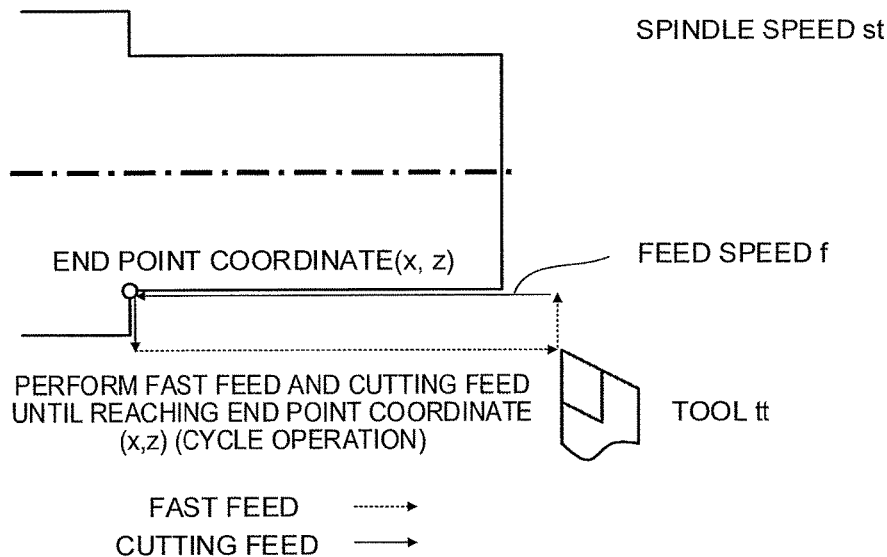

SPINDLE SPEED st
END POINT COORDINATE(x, z)
FEED SPEED f
PERFORM FAST FEED AND CUTTING FEED UNTIL REACHING END POINT COORDINATE (x,z) (CYCLE OPERATION)
TOOL tt

FAST FEED ------▶
CUTTING FEED ──▶

G90 Xx Zz Sst Ff Ttt

- x: X-AXIS COORDINATE VALUE OF TURNING END POINT (OR, MOVEMENT AMOUNT IN X-AXIS DIRECTION FROM CURRENT POSITION TO TURNING END POINT)
- z: Z-AXIS COORDINATE VALUE OF TURNING END POINT (OR, MOVEMENT AMOUNT IN Z-AXIS DIRECTION FROM CURRENT POSITION TO TURNING END POINT)
- st: SPINDLE SPEED DURING TURNING
- f: FEED SPEED DURING TURNING
- tt: TOOL NUMBER THAT IS USED DURING TURNING

PROGRAM EXAMPLE)
N0001 G90 X100. Z10. S1000. F100. T5

FIG.3

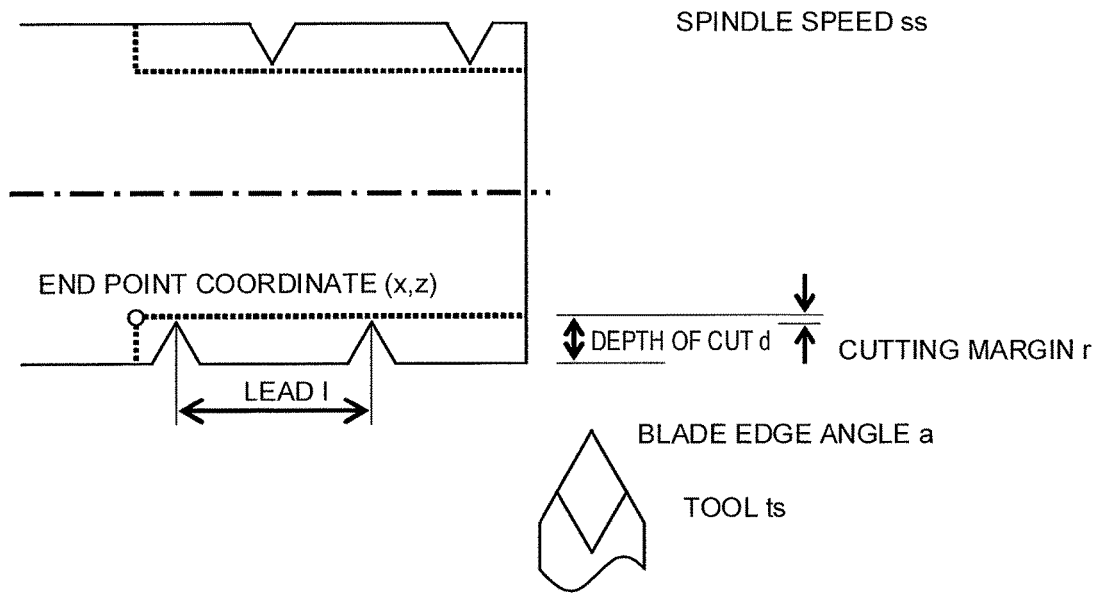

G91.1 Ll Sss Tts Dd Qq Kk Rr Aa ··· NICKING MODE ON (SINGLE-EDGED CUTTING)
G92.1 Ll Sss Tts Dd Qq Kk Rr Aa ··· NICKING MODE ON (ZIGZAG CUTTING)
G90.1 ··· NICKING MODE OFF l: LEAD OF NICK
    ss: SPINDLE SPEED DURING NICKING
    ts: TOOL NUMBER THAT IS USED DURING NICKING
    d: DEPTH OF CUT
    q: FIRST DEPTH OF CUT OF NICKING
    k: MINIMUM DEPTH OF CUT
    r: CUTTING MARGIN
    a: BLADE EDGE ANGLE THAT IS USED DURING NICKING

PROGRAM EXAMPLE)
N0001 G91.1 L5. S1000. T6 D0.5 Q0.1 K0.05 R0.01 A30
N0002 G90 X100. Z10. S1000. F100. T5
N0003 G90.1

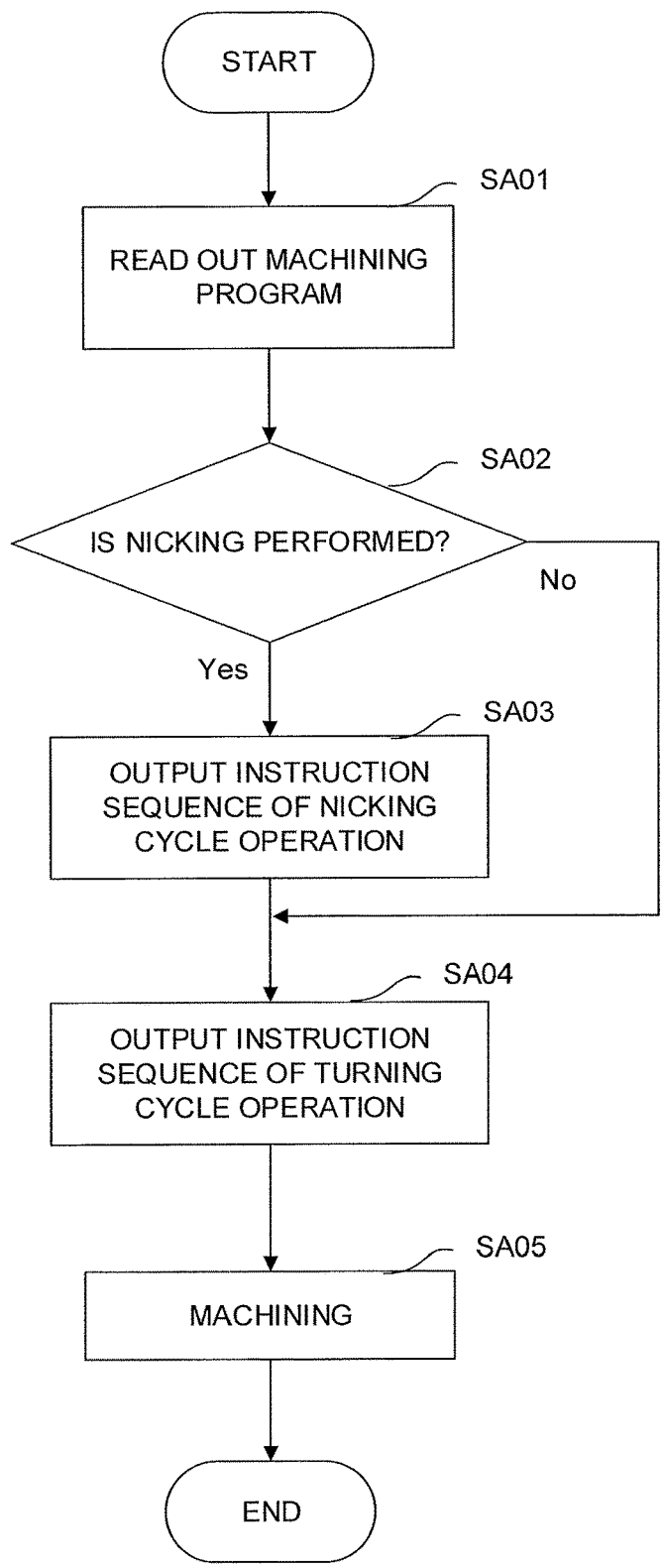

PROGRAM EXAMPLE)
N0001 G91.1 L5. S1000. T6 D0.5 Q0.1 K0.05 R0.01 A30
N0002 G90 X100. Z10. S1000. F100. T5 I1.
N0003 G90.1

[NICKING] WORKPIECE

[REGULAR TURNING]

CHIP
TURRET

LEAD OF NICK: l
CUTTING MARGIN: r
DEPTH OF CUT: d-r

FEED SPEED: f
DEPTH OF CUT: d

NUMERICAL CONTROLLER

BACKGROUND OF THE INVENTION

1. Field of the Invention

The present invention relates to a numerical controller, and particularly to a numerical controller that performs fixed cycle operation control of nicking in order to shred chips.

2. Description of the Related Art

Conventionally, there is a technique relating to boring machining in which a groove is machined in the axial direction in a part of allowance of boring in advance using a bar cutter having a smaller diameter than a boring diameter so as to prevent generation of long chips as illustrated in FIG. 11 (for example, JP H04-360704 A).

The technique disclosed in JP H04-360704 A is limited to the boring machining, and there is no comment regarding other machining methods, for example, turning. When the technique disclosed in JP H04-360704 A is applied to the turning, it is possible to conceive a method of machining an axial groove illustrated in FIG. 12, for example. When the axial groove illustrated in FIG. 12 is machined in a workpiece to be subjected to the turning, it is necessary to stop rotation of the workpiece first, and then, perform the machining in a separate step using a drilling tool. However, the machining is not the turning, and thus, there is a problem that the machining procedure becomes complicated. In addition, it is also possible performing the machining by preparing a machine such as a machining center in addition to a machining machine to perform the turning, but there is a problem that cost increases because it is necessary to prepare the two machines.

SUMMARY OF THE INVENTION

Thus, an object of the present invention is to provide a numerical controller that is capable of performing nicking with respect to a workpiece in order to shred chips by turning.

In the present invention, a nick is formed in a workpiece in advance before regular turning by inserting a cycle for machining the nick as illustrated in the left drawing of FIG. 1. The regular turning is performed after forming the nick as illustrated in the right drawing of FIG. 1, and accordingly, chips are shredded at a nick portion. Machining conditions such as a lead 1 of the nick and a cutting margin r to a depth of cut d of the regular turning can be designated by a machining program.

Further, the numerical controller according to the present invention is configured to control a machine which performs turning on a workpiece based on a program, the numerical controller, and includes: a turning condition designation unit that designates a machining condition of turning; a nicking condition designation unit that designates a machining condition of nicking; a fixed cycle instruction analysis unit that generates an instruction sequence of a turning cycle operation based on the turning machining condition; and a nicking operation instruction generation unit that generates an instruction sequence of a nicking cycle operation based on the turning machining condition and the nicking machining condition. The instruction sequence of the nicking cycle operation is executed prior to execution of the instruction sequence of the turning cycle operation.

In the numerical controller, the turning condition designation unit designates the turning machining condition according to an instruction included in the program.

In the numerical controller, the turning condition designation unit designates the turning machining condition according to a parameter.

In the numerical controller, the turning condition designation unit designates the nicking machining condition according to an instruction included in the program.

In the numerical controller, the turning condition designation unit designates the nicking machining condition according to a parameter.

In the present invention, it is possible to shred chips at regular turning by machining a nick before performing the regular turning. In addition, it is possible to machine the nick only using a lathe without requiring machining by a separate machine such as a machining center. In addition, a tool, a workpiece, and a worker are spared from being damaged since the chips are shredded in the present invention. In addition, the number of times of stopping the operation and opening a door of a machine in order to remove accumulate chips decreases, and thus, a load of a worker is reduced, and idle time of the machine is also reduced.

BRIEF DESCRIPTION OF THE DRAWINGS

The above-described and other objects and characteristics of the present invention are made apparent in the following description of an embodiment with reference to the appended drawings. Of these drawings:

FIG. 1 is a diagram for describing nicking by turning according to the present invention;

FIG. 2 is a diagram illustrating an example of a fixed cycle instruction of the turning;

FIG. 3 is a diagram illustrating an example of a fixed cycle instruction of the nicking which is introduced according to the present invention;

FIG. 6 is a flowchart for describing a process according to the turning which is executed on a numerical controller 1 of FIG. 4;

DETAILED DESCRIPTION OF THE PREFERRED EMBODIMENTS

Hereinafter, an embodiment of the present invention will be described with reference to the drawings.

In a numerical controller according to the embodiment of the present invention, a nicking operation is realized by introducing a fixed cycle instruction of nicking as one of a fixed cycle instruction. The nicking fixed cycle instruction according to the present embodiment is used as an instruction to assist a fixed cycle instruction of turning.

FIG. 2 is an example in which the fixed cycle instructions of the turning are defined as G codes. When the G code illustrated in FIG. 2 is instructed by a program, the numerical controller executes a turning control through a cycle operation in which a spindle to which a workpiece is attached is rotated at a spindle speed st to perform fast feed or cutting feed of a tool tt toward an end point coordinate (x,z) at a feed speed f, based on a turning machining condition according to the instruction.

On the other hand, FIG. 3 illustrates an example in which the fixed cycle instructions of the nicking are defined as G codes. The fixed cycle instructions of the nicking illustrated in FIG. 3 include three instructions, that is, instructions G91.1 and G92.1 to turn on a nicking mode and an instruction G90.1 to turn off the nicking mode. When the instruction G91.1 or G92.1 to turn on the nicking mode is instructed by the program, each nicking mode by a single-edged cutting and zigzag cutting is set to the on-state. Further, when the turning fixed cycle instruction is instructed during the on-state of the nicking mode, the nicking is executed in accordance with a nicking machining condition instructed by the nicking fixed cycle instruction before a turning cycle operation instructed by the turning fixed cycle instruction is executed. For example, when a turning fixed cycle instruction N0002 is executed in a program example illustrated in FIG. 3, the nicking is performed under the machining condition (the spindle to which the workpiece is attached is rotated at a spindle speed ss using a tool is with a first depth of cut is q until a final depth of cut d—a cutting margin r), which is instructed by a nicking fixed cycle instruction N0001, prior to start of the turning instructed by the turning fixed cycle instruction.

Hereinafter, a description will be given regarding a specific configuration of the numerical controller that executes the above-described nicking fixed cycle instruction.

Figure 4:
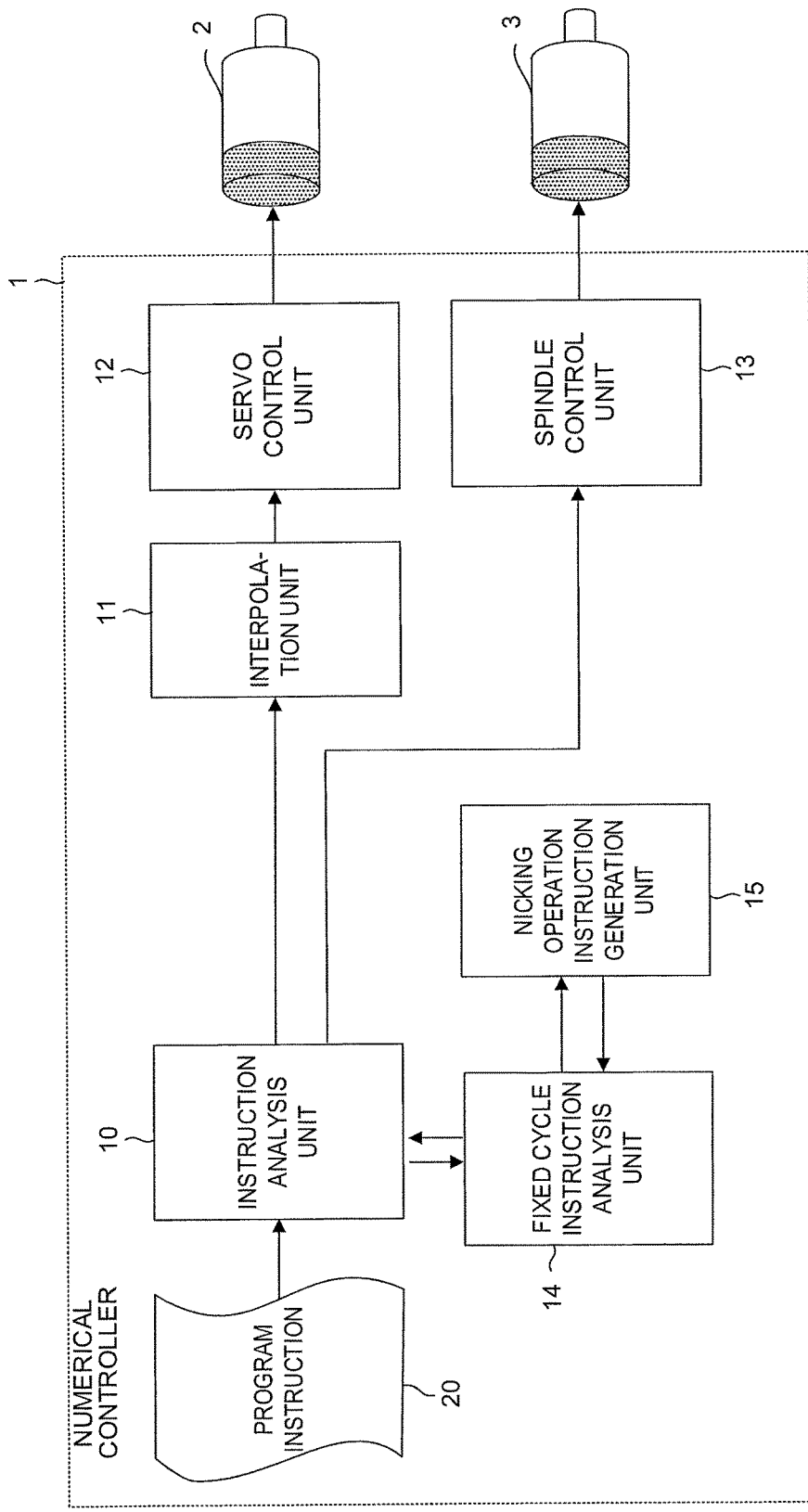
FIG. 4 is a schematic block diagram of a numerical controller according to an embodiment of the present invention.

FIG. 4 illustrates a functional block diagram of the numerical controller according to the embodiment of the present invention. A numerical controller 1 according to the present embodiment includes an instruction analysis unit 10, an interpolation unit 11, a servo control unit 12, a spindle control unit 13, a fixed cycle instruction analysis unit 14, and a nicking operation instruction generation unit 15. In addition, a program instruction 20 is stored in a memory (not illustrated) in the numerical controller 1 according to the present embodiment, and the program instruction 20 functions as a turning condition designation unit that designates a turning machining condition and a nicking condition designation unit that designates a nicking machining condition.

The instruction analysis unit 10 reads out the program instruction 20 from the program or the like stored in the memory (not illustrated). Further, when the read-out instruction is a feed instruction or the like that is normally used, the instruction analysis unit 10 analyzes the read-out instruction, creates movement instruction data to instruct movement of each axis based on a result of the analysis, and outputs this data to the interpolation unit 11, and further, creates rotation instruction data of the spindle and outputs this data to the spindle control unit 13. In addition, when the read-out instruction is the fixed cycle instruction such as a turning instruction, the instruction analysis unit 10 instructs the fixed cycle instruction analysis unit 14 to analyze the fixed cycle instruction, and thereafter, sequentially analyzes an instruction sequence output from the fixed cycle instruction analysis unit 14, creates movement instruction data to instruct movement of each axis based on a result of the analysis, and outputs this data to the interpolation unit 11, and further, creates rotation instruction data of the spindle and outputs this data to the spindle control unit 13.

The interpolation unit 11 generates interpolation data obtained by performing interpolation calculation of a point on an instruction path, which is instructed based on the movement instruction data acquired from the instruction analysis unit, with an interpolation cycle. In addition, acceleration/deceleration of the interpolation data is performed after the interpolation to calculate speed of each drive axis for each interpolation cycle, and result data thereof is output to the servo control unit 12.

The servo control unit 12 controls a servo motor 2 that controls each axis serving as a control target based on the output of the interpolation unit 11. In addition, the spindle control unit 13 controls a spindle motor 3 based on the rotation instruction data from the instruction analysis unit 10.

The fixed cycle instruction analysis unit 14 analyzes a fixed cycle instruction based on an analysis instruction of the fixed cycle instruction from the instruction analysis unit 10, creates the instruction sequence of the cycle operation instructed according to the fixed cycle instruction based on a result of the analysis, and outputs the created instruction sequence of the cycle operation to the instruction analysis unit 10. The instruction sequence of the cycle operation created by the fixed cycle instruction analysis unit 14 includes a series of a fast feed instruction and a cutting feed instruction to instruct fast feed and cutting feed operations of the tool illustrated in FIG. 2, for example. A general method of generating an instruction sequence of a cycle operation based on a fixed cycle instruction is already known in, for example, JP H07-253810 A and the like, and thus, details thereof will be omitted in the present specification.

The fixed cycle instruction analysis unit 14 turns on the nicking mode and stores a machining condition, instructed by a nicking fixed cycle instruction, in the memory (not illustrated) when a fixed cycle instruction, instructed to perform analysis by the instruction analysis unit 10, is the nicking fixed cycle instruction to turn on the nicking mode. On the other hand, the fixed cycle instruction analysis unit 14 switches off the nicking mode when a fixed cycle instruction, instructed to perform analysis by the instruction analysis unit 10, is a nicking fixed cycle instruction to turn off the nicking mode.

When a fixed cycle instruction, instructed to perform analysis by the instruction analysis unit 10, is a turning fixed cycle instruction, the fixed cycle instruction analysis unit 14 determines whether the nicking mode is the on-state, analyzes the turning fixed cycle instruction if the nicking mode is in the off-state, creates an instruction sequence of a cycle operation instructed according to the turning fixed cycle instruction based on a result of the analysis, and outputs the created instruction sequence of the cycle operation to the instruction analysis unit 10. In addition, the fixed cycle instruction analysis unit 14 instructs the nicking operation instruction generation unit 15 to generate an instruction sequence of a nicking operation based on a machining condition stored in the memory (not illustrated) and a machining condition instructed according to the turning fixed cycle instruction if the nicking mode is in the on-state. Further, the fixed cycle instruction analysis unit 14 outputs the nicking operation instruction sequence output from the nicking operation instruction generation unit 15 to the instruction analysis unit 10, thereafter, analyzes the turning fixed cycle instruction, creates an instruction sequence of a cycle operation instructed according to the turning fixed cycle instruction based on a result of the analysis, and outputs the created instruction sequence of the cycle operation to the instruction analysis unit 10.

The nicking operation instruction generation unit 15 generates the nicking operation instruction sequence based on the instruction from the fixed cycle instruction analysis unit 14.

First, it is determined whether a tool that is currently used is different from a tool (nicking tool) that is designated according to the nicking fixed cycle instruction during the nicking operation, and the tool is exchanged with the tool instructed according to the nicking fixed cycle instruction when determined to be different. Incidentally, the exchange of the tool is not performed when the exchange of the tool is not instructed according to the nicking fixed cycle instruction.

Next, it is allowed to machine a nick by performing cutting in a plurality of times until obtaining a depth of cut instructed by the program because a cutting load is great and the breakage of the tool is caused if the nick is machined at the same depth of cut as a depth of cut by turning although it is necessary to perform the feed at a higher speed than a feed speed of the regular turning in order to machine the nick illustrated in FIG. 1. Thus, it is configured to start Z-axis feed after detecting one rotation signal that is a signal to be output once per rotation of the spindle during the nicking, which is similar to threading. As illustrated in FIG. 3, the first depth of cut q of the nicking is instructed by the nicking fixed cycle instruction. When the number of times of cut in the nicking is set to n, an n-th depth of cut becomes q/n. Meanwhile, the minimum value k of the depth of cut is instructed by the nicking fixed cycle instruction as illustrated in FIG. 3.

Figure 5A:
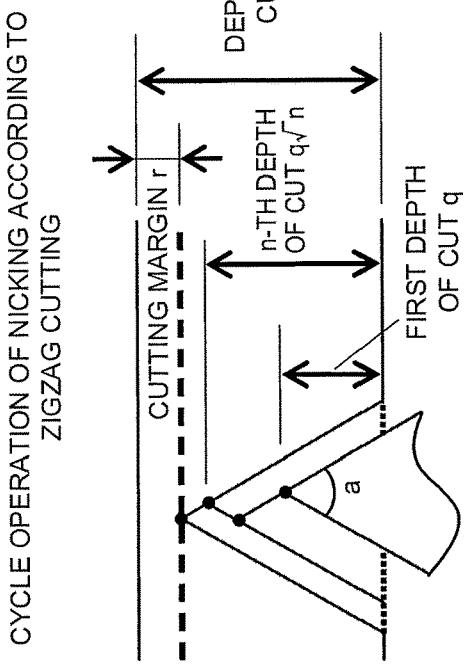
FIGS. 5A and 5B are diagrams for describing each nicking cycle operation of single-edged cutting and zigzag cutting according to the present invention.
Figure 5B:
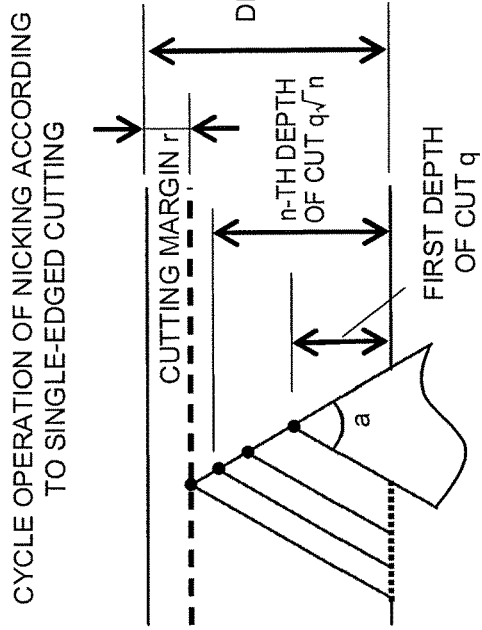

In addition, a cut position in each cycle operation according to single-edged cutting and zigzag cutting illustrated in FIGS. 5A and 5B is calculated by instructing a blade edge angle a of the tool used for the nicking using the nicking fixed cycle instruction. The nicking cycle operation is repeated until only the cutting margin r remains.

Further, when the nicking cycle operation is completed, the tool is exchanged with the tool instructed according to the turning fixed cycle instruction.

The nicking operation instruction generation unit 15 generates the instruction sequence of the above-described operation, and outputs the instruction sequence to the fixed cycle instruction analysis unit 14.

A description will be given regarding an over view of the operation at the time of reading out the turning fixed cycle instruction in the numerical controller 1 of the present embodiment with reference to a flowchart of FIG. 6.

[Step SA01] The instruction analysis unit 10 reads out the turning fixed cycle instruction from the program. The machining condition of the turning cycle operation is instructed in the turning fixed cycle instruction. The instruction analysis unit 10 instructs the fixed cycle instruction analysis unit 14 to analyze the turning fixed cycle instruction.

[Step SA02] The fixed cycle instruction analysis unit 14 determines whether the nicking mode is in the on-state. The process proceeds to Step SA03 in the on-state of the nicking mode, and proceeds to Step SA04 in the off-state of the nicking mode.

[Step SA03] The nicking operation instruction generation unit 15 generates the instruction sequence of the nicking cycle operation based on the turning machining condition instructed using the turning fixed cycle instruction and the nicking machining condition set in the nicking mode according to the instruction from the fixed cycle instruction analysis unit 14, and outputs the generated instruction sequence to the fixed cycle instruction analysis unit 14.

[Step SA04] The fixed cycle instruction analysis unit 14 generates the instruction sequence of the turning cycle operation based on the turning machining condition instructed using the turning fixed cycle instruction, and outputs the generated instruction sequence of the turning cycle operation to the instruction analysis unit 10 together with the instruction sequence of the nicking cycle operation generated by the nicking operation instruction generation unit 15 in Step SA03.

[Step SA05] The instruction analysis unit 10 analyzes the instruction sequence received from the fixed cycle instruction analysis unit 14, generates the movement instruction data and outputs the data to the interpolation unit 11, and further, generates the rotation instruction data of the spindle and outputs the data to the spindle control unit 13, thereby performing machining.

Figure 7:
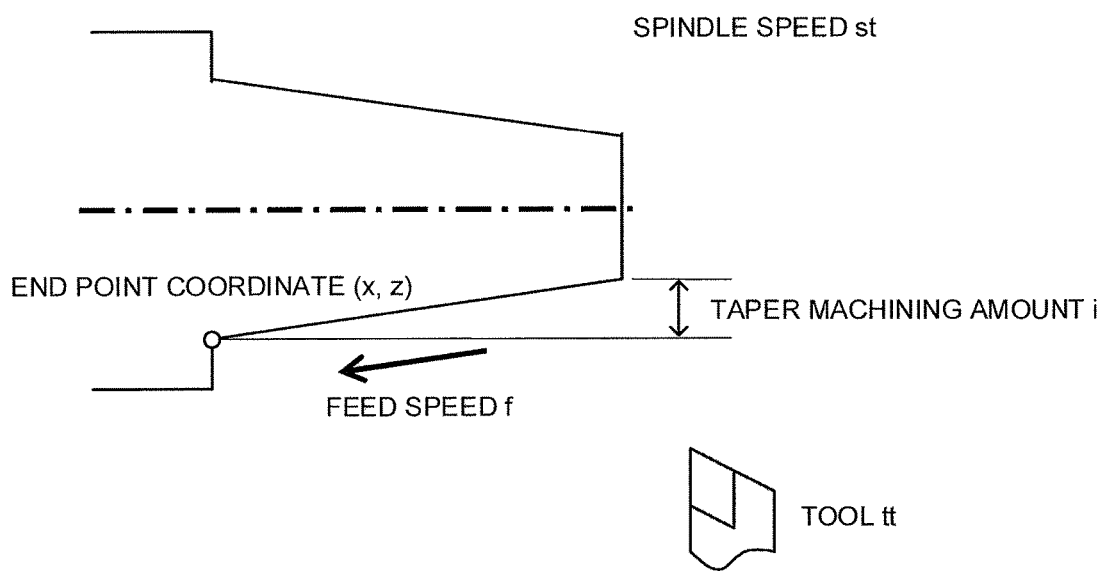
FIG. 7 is a diagram illustrating an example in which taper machining is performed by the numerical controller according to the present invention.

In the above-described numerical controller, it is also possible to apply the turning fixed cycle to a taper machining as illustrated in FIG. 7 by adding a taper machining amount i to the machining condition which is instructed using the turning fixed cycle instruction illustrated in FIGS. 2 and 3. The application to the taper machining is realized by adding a cutting feed instruction, which causes a tool to move along a slope of the taper machining, to the instruction sequence during the nicking cycle operation.

Figure 8:
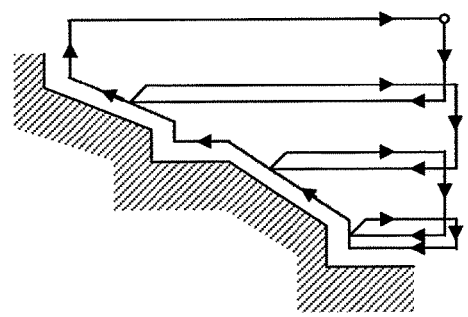
FIG. 8 is a diagram illustrating an example in which machining according to a complex fixed cycle is performed by the numerical controller according to the present invention.
Figure 9:
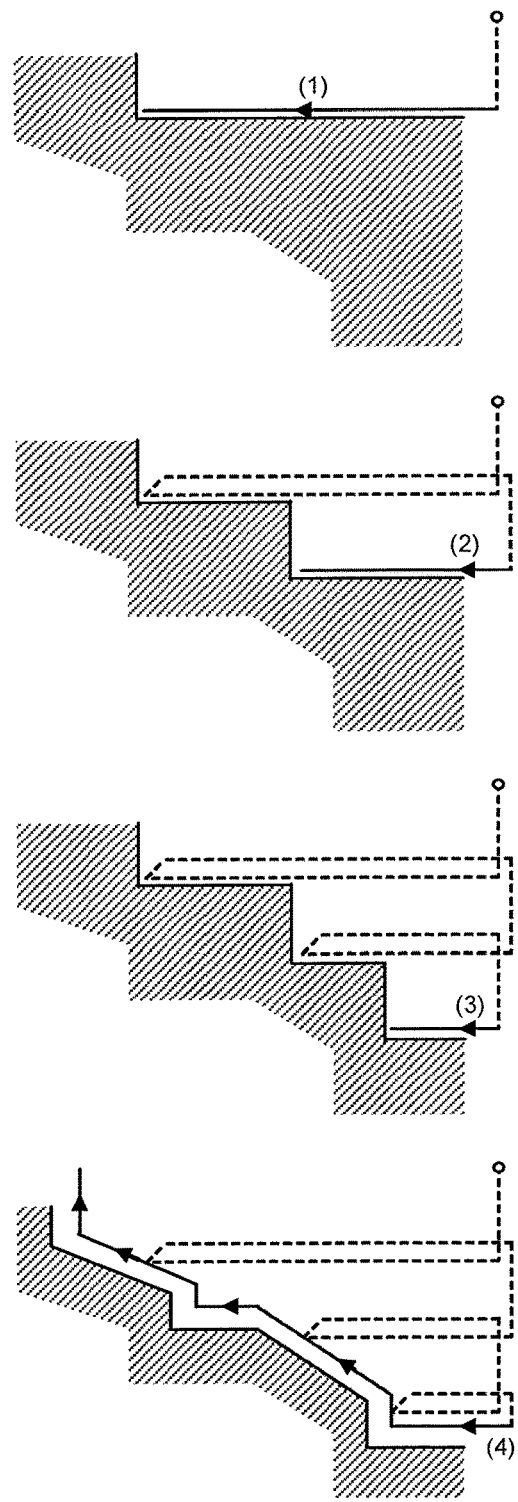
FIG. 9 is a diagram illustrating a position to which the nicking cycle operation is inserted at the time of performing the machining according to the complex fixed cycle by the numerical controller according to the present invention.
Figure 11:
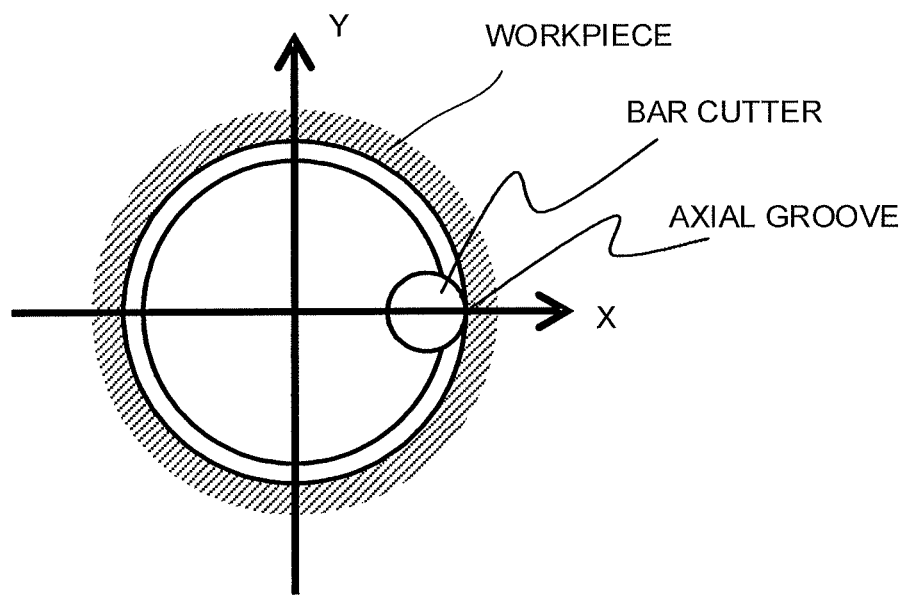
FIG. 11 is a diagram for describing grooving according to the related art.
Figure 12:
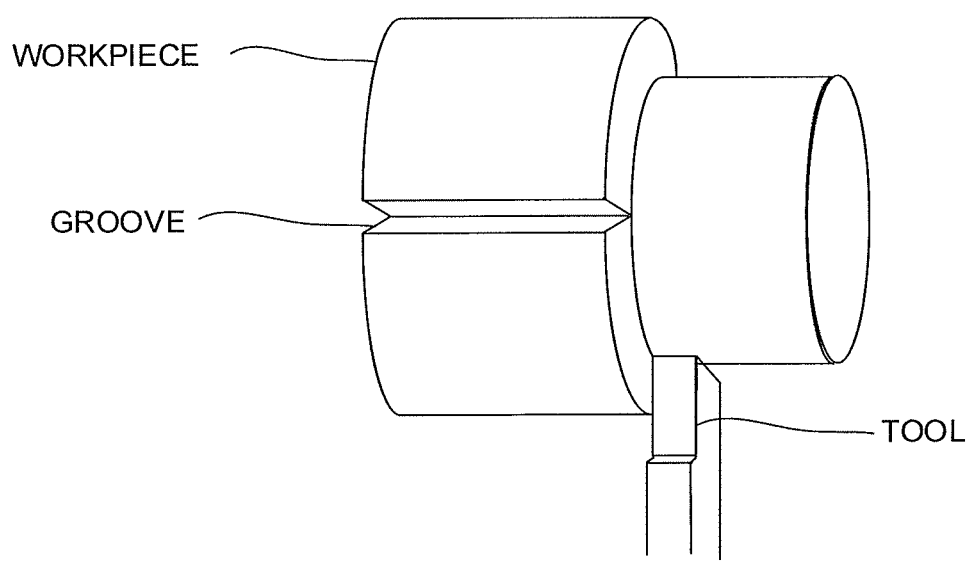
FIG. 12 is a diagram illustrating an example in which the grooving according to the related art is applied to the turning.

In addition, the numerical controller 1 also provides a complex fixed cycle in which a finishing shape is instructed by a machining program to automatically set a tool path of rough cutting in the middle of machining and to perform the machining as illustrated in FIG. 8 (for example, JP 2015-011669 A). Chips are shredded by inserting a nicking cycle prior to turning in the complex fixed cycle, too. For example, the machining path in the machining using the complex fixed cycle illustrated in FIG. 8 can be broken down as illustrated in FIG. 9, and the above-described nicking cycle operation may be inserted immediately before performing machining along a machining path (1), a machining path (2), a machining path (3), and a machining path (4) in the machining paths of FIG. 9.

The embodiment of the present invention has been described as above, but the present invention is not limited only to the above-described embodiment and can be implemented in various modes by applying suitable modifications.

Although the description has been given in the above-described embodiment with the example in which the instruction of the program is used as the turning condition designation unit to designate the turning machining condition and the nicking condition designation unit to designate the nicking machining condition, it may be configured such that these machining conditions are stored as parameters, and these parameters function as the turning condition designation unit to designate the turning machining condition and the nicking condition designation unit to designate the nicking machining condition when the instruction of the machining condition is omitted in the program, and the machining condition stored in the parameter is read out and used, for example.

In addition, it may be configured such that the nicking mode can be instructed using a signal instead of the nicking fixed cycle instruction. In this case, the nicking cycle operation is inserted prior to the turning cycle operation when the turning fixed cycle instruction is executed during an ON-state of the signal to instruct the nicking mode. Incidentally, the machining condition stored in the parameter is used as the nicking machining condition at this time.

Figure 10:
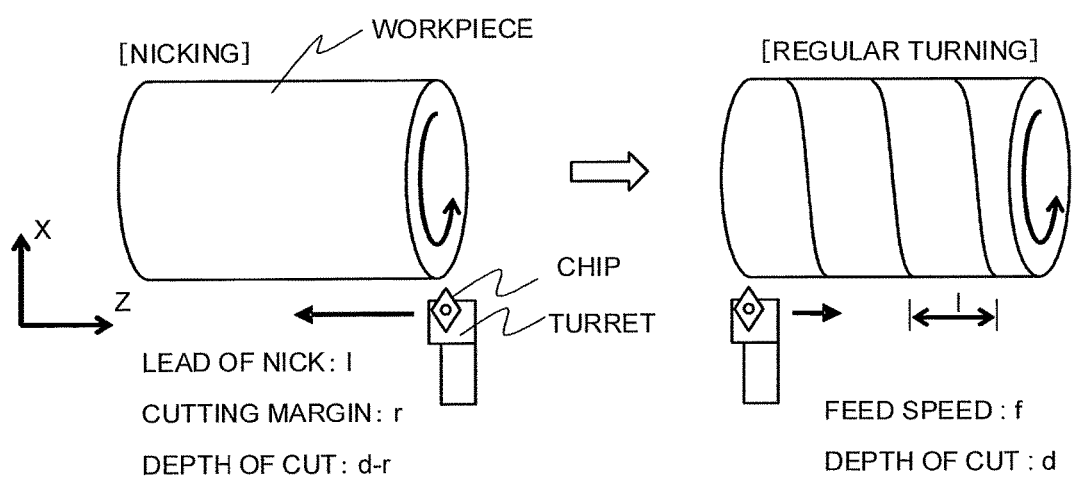
FIG. 10 is a diagram illustrating an example in which a cycle time is shortened using a tool capable of machining regardless of a movement direction by the numerical controller according to the present invention.

Further, it is possible to shorten the cycle time by configuring the numerical controller to perform the nicking when the tool is fed in the negative Z direction and to perform the turning when the tool turns in the positive Z direction as illustrated in FIG. 10, for example, in a case in which a tool capable of performing machining regardless of a Z-axis movement direction during the nicking and it is unnecessary to exchange the tool between the nicking and the turning.

The embodiment of the present invention has been described as above, but the present invention is not limited to the above-described embodiment and can be implemented in various modes by applying suitable modifications.

The invention claimed is:

1. A numerical controller that controls a machine which performs turning on a workpiece based on a program, the numerical controller comprising:
   a motor controller for controlling movement of a tool of the machine and rotation of spindle connected to the workpiece;
   a processor configured to:
      designate a machining condition of turning;
      designate a machining condition of nicking;
      generate an instruction sequence of a turning cycle operation based on the turning machining condition to continuously cut the workpiece to a predetermined cut depth along a predetermined cut length in an axial direction;
      generate an instruction sequence of a nicking cycle operation based on the turning machining condition and the nicking machining condition to cut a nick to a predetermined nick depth into the workpiece at a predetermined nick location along the axial direction; and
      instruct the motor controller to execute the instruction sequence of the nicking cycle operation by rotating the spindle and moving the tool in s first movement pattern prior to instructing the motor controller to execute the instruction sequence the turning cycle operation by rotating the spindle and moving the tool in a second movement pattern.

2. The numerical controller according to claim 1, wherein the processor is further configured to designate the turning machining condition according to an instruction included in the program.

3. The numerical controller according to claim 1, wherein the processor is further configured to designate the turning machining condition according to a parameter.

4. The numerical controller according to claim 1, wherein the processor is further configured to designate the nicking machining condition according to an instruction included in the program.

5. The numerical controller according to claim 1, wherein the processor is further configured to designate the nicking machining condition according to a parameter.

* * * * *